US008812501B2

(12) United States Patent
Pradhan

(10) Patent No.: US 8,812,501 B2
(45) Date of Patent: Aug. 19, 2014

(54) METHOD OR APPARATUS FOR SELECTING A CLUSTER IN A GROUP OF NODES

(75) Inventor: Tanmay Kumar Pradhan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1311 days.

(21) Appl. No.: 11/491,362

(22) Filed: Jul. 24, 2006

(65) Prior Publication Data

US 2007/0033205 A1 Feb. 8, 2007

(30) Foreign Application Priority Data

Aug. 8, 2005 (IN) .......................... 1097/CHE/2005

(51) Int. Cl.
*G06F 7/00* (2006.01)
*G06F 9/50* (2006.01)

(52) U.S. Cl.
CPC .................................. *G06F 9/5061* (2013.01)
USPC .......................................................... 707/737

(58) Field of Classification Search
CPC ...... G06F 3/1204; G06F 13/37; G06F 17/277
USPC .................. 707/205, 737, 700, 688, 999.006; 709/200

See application file for complete search history.

(56) References Cited

U.S. PATENT DOCUMENTS

| 5,784,648 | A  | * | 7/1998  | Duckwall ..................... 710/40 |
| 6,243,825 | B1 | * | 6/2001  | Gamache et al. ................. 714/4 |
| 6,363,495 | B1 | * | 3/2002  | MacKenzie et al. ............. 714/4 |
| 6,449,641 | B1 | * | 9/2002  | Moiin et al. .................. 709/220 |
| 6,662,219 | B1 | * | 12/2003 | Nishanov et al. ............. 709/220 |
| 6,748,429 | B1 | * | 6/2004  | Talluri et al. ................ 709/221 |
| 7,299,294 | B1 | * | 11/2007 | Bruck et al. .................. 709/235 |
| 2003/0078946 | A1 | * | 4/2003 | Costello et al. .............. 707/201 |
| 2003/0187927 | A1 | * | 10/2003 | Winchell ...................... 709/204 |
| 2004/0148326 | A1 | * | 7/2004 | Nadgir et al. ................. 709/200 |
| 2005/0074806 | A1 | * | 4/2005 | Skierczynski et al. ............ 435/6 |
| 2005/0268154 | A1 | * | 12/2005 | Wipfel et al. .................... 714/4 |
| 2006/0282443 | A1 | * | 12/2006 | Hanagata ..................... 707/100 |
| 2007/0016822 | A1 | * | 1/2007 | Rao et al. ....................... 714/4 |
| 2007/0129928 | A1 | * | 6/2007 | Lin et al. ....................... 703/17 |
| 2007/0255813 | A1 | * | 11/2007 | Hoover et al. ................ 709/223 |
| 2007/0288935 | A1 | * | 12/2007 | Tannenbaum et al. ........ 719/319 |

* cited by examiner

*Primary Examiner* — Mohammed R Uddin

(57) ABSTRACT

A method and apparatus is disclosed for selecting a cluster in a group of nodes in which a token is assigned to a first node of a group of nodes, subgroups of nodes that are interconnected are identified and if the two largest said subgroups comprise equal numbers of nodes then the subgroup containing the node to which said token is assigned is selected as the cluster.

23 Claims, 4 Drawing Sheets

METHOD OR APPARATUS FOR SELECTING A CLUSTER IN A GROUP OF NODES

RELATED APPLICATION

The present application is based on, and claims priority from, India Application Number IN1097/CHE/2005, filed Aug. 8, 2005, the disclosure of which is hereby incorporated by reference herein in its entirety.

BACKGROUND OF THE INVENTION

1. Field of the Invention

The present invention relates to a method or apparatus for selecting a cluster in a group of nodes, and more particularly to assigning, identifying, and selecting a subgroup in a group of nodes.

2. Description of the Prior Art

Computer systems which need to be highly reliable both in terms of service availability and data integrity are commonly implemented using cluster architecture. A cluster is made up a group of interconnected computers (nodes) running cluster software which enables the group to behave like a single computer. The nodes communicate with each other via a set of network connections referred to as a cluster interconnect. A cluster will generally have shared data storage devices connected to the nodes via a shared storage bus. The cluster software running on each node is arranged so that in the event of failure of any node in the cluster, the functions and services provided by the cluster are unaffected.

Failures can occur in the nodes themselves or in the cluster interconnect. In the event of a failure in the cluster interconnect, the cluster becomes split into subgroups of nodes, each unable to communicate with other subgroups. In such circumstances, the cluster software is arranged to spontaneously reorganize the subgroups to form one or more new candidate clusters. The largest candidate cluster is self selected to continue to provide the cluster functions and services. Each node knows the total number of nodes in the system and this data is used by each candidate cluster to determine whether the number of nodes it contains makes it the largest cluster. However, if two candidate clusters are the same size then this method can result in more than one cluster considering themselves to be the largest. In this case more than one cluster can accesses the cluster data set and compromise the integrity of that data.

In order to deal with this problem, some systems use a predetermined hardware element, such as a disk drive, as a tie breaker. This chosen hardware element is connected to the shared storage bus and thus connected to all nodes in the cluster. In the event of a failure in the cluster interconnect, the candidate which acquires access to the hardware first during the reorganization of nodes forms the cluster. In other words, given subgroups of the same size, the subgroup which is first in communication with the specified hardware is chosen to continue as the cluster. However, using a hardware element in this way can increase the overall hardware costs of the cluster system. Also, accessing the hardware element increases the network activity and processing complexity during the node reorganization process.

BRIEF DESCRIPTION OF THE DRAWINGS

Brief Summary of the Invention

There will be described a method of selecting, or constituting, a cluster in a group of nodes, the method comprising the steps of:

a) assigning a token to a first node in a group of nodes;
b) identifying subgroups of nodes that are interconnected; and
c) if the two largest subgroups comprise equal numbers of nodes then selecting as the cluster the subgroup containing the node to which the token is assigned.

Figure 1:
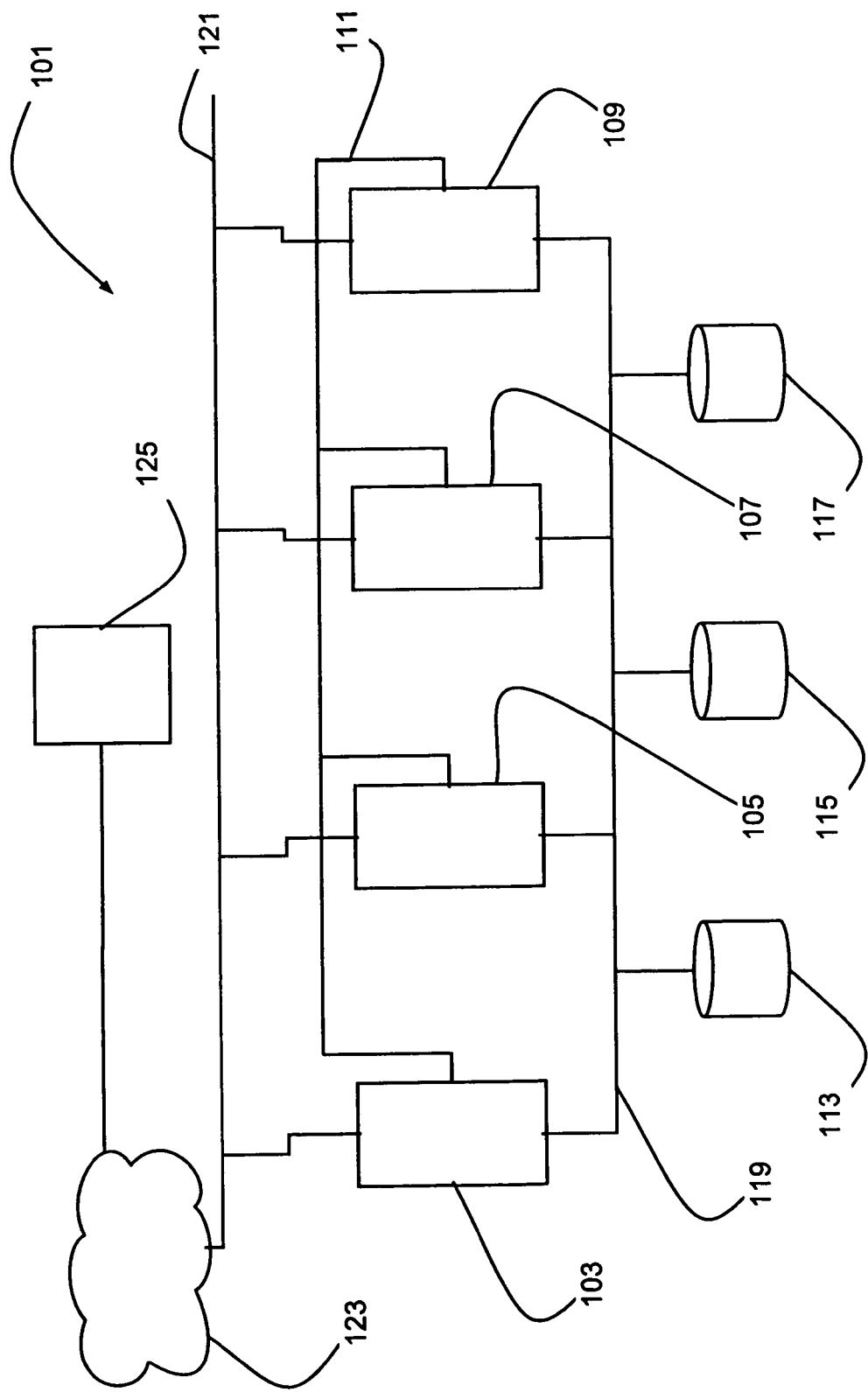
Figure 2:
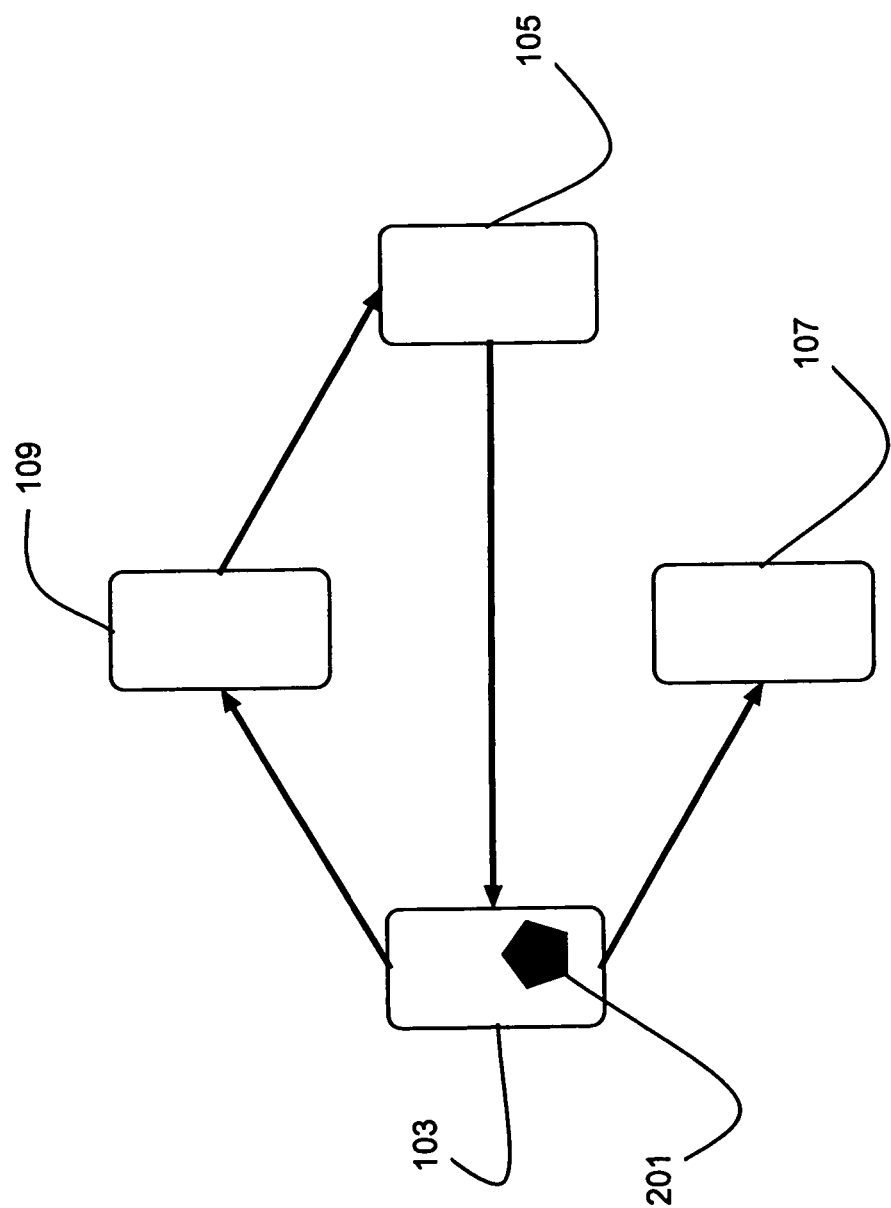
Figure 3:
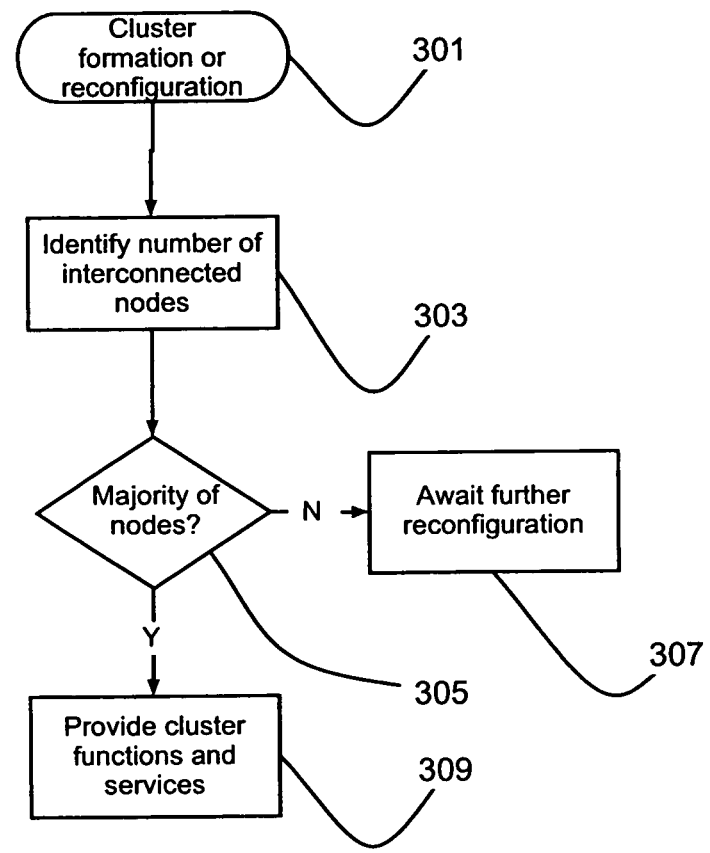
Figure 4:
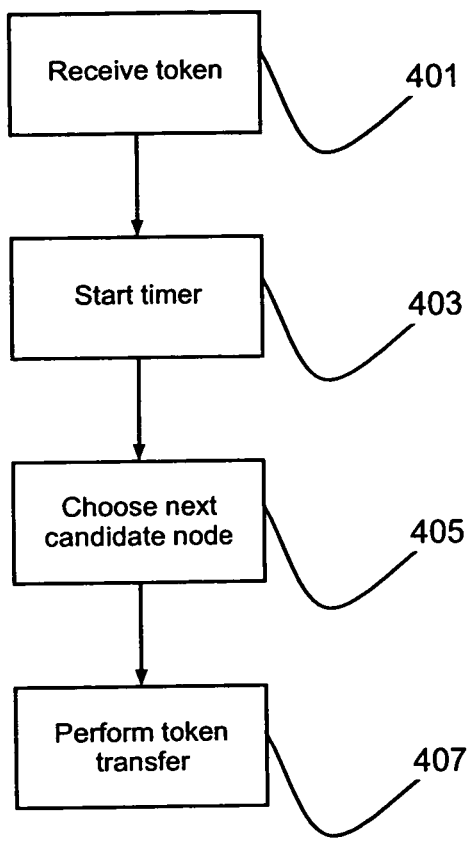

Embodiments of the invention will now be described, by way of example only, with reference to the accompanying drawings in which:

FIG. 1 is a schematic illustration of a computer system including a cluster server (cluster) according to an embodiment of the invention;

FIG. 2 is a diagram illustrating the passing of a token between nodes in the cluster of FIG. 1;

FIG. 3 is a flow chart illustrating processing carried out during the formation or reorganization of the cluster of FIG. 1; and FIG. 4 is a flow chart illustrating processing carried out during the formation and operation of each node of the cluster of FIG. 1.

DETAILED DESCRIPTION OF PREFERRED EMBODIMENTS OF THE INVENTION

There will be described a method of selecting, or constituting, a cluster in a group of nodes, the method comprising the steps of:

a) assigning a token to a first node in a group of nodes;
b) identifying subgroups of nodes that are interconnected; and
c) if the two largest the subgroups comprise equal numbers of nodes then selecting as the cluster the subgroup containing the node to which the token is assigned.

The token may be passed from one node to another. The token may be passed between nodes at predetermined time intervals or at random time intervals. The passing of the token can be suspended. The first node may be the first node assigned to the cluster during cluster configuration. If a node holding the token is required to shut down then prior to shut down the token may be passed to another node. If a node holding the token crashes then step c) may be suspended until the node reboots. The passing of the token between nodes may be carried out atomically so that the token is not lost and remains unique. The passing of the token between nodes is carried out using a three phase commit protocol. Each node may be assigned one or more votes and in step c) if two subgroups hold the largest numbers of votes then selecting as the cluster the subgroup containing the node to which the token is assigned. The token may count for one or more votes. The number of votes or nodes held by a subgroup may be treated as being equal if the difference between them falls within a predetermined limit.

Also described will be an apparatus for selecting a cluster in a group of nodes, the apparatus comprising:

a) a token assigned to a node in a group of nodes;
b) communication means for identifying subgroups of nodes that are interconnected; and
c) selecting means operable if the two largest the subgroups comprise equal numbers of nodes to select as the cluster the subgroup containing the node to which the token is assigned.

There will also be described a method of operating a node in a cluster, the method comprising the steps of:

a) determining the number of other nodes connected to the current node forming a connected group;
b) if the connected group of nodes comprises more than half of the total nodes in the cluster, then forming the cluster from the group; or c) if the connected group comprises half of the total nodes then forming the cluster if the connected group includes a node to which a token is assigned.

Also described will be a node in a cluster comprising:
a) means for determining the number of other nodes connected to the current node forming a connected group;
b) means operable if the connected group of nodes comprises more than half of the total nodes in the cluster, to form the cluster from the group; or
c) means operable if the connected group comprises half of the total nodes to form the cluster if the connected group includes a node to which a token is assigned.

Further described will be a method of selecting a cluster in a group of nodes, the method comprising the steps of:
a) assigning a token at random to a node in a group of nodes;
b) assigning a vote to each node;
b) identifying subgroups of interconnected nodes; and
c) if the number of votes of the largest subgroups are equal then selecting as the cluster the subgroup containing the node to which the token is assigned, otherwise selecting the subgroup with the majority of votes.

Some embodiments are implemented as a computer program or group of computer programs arranged to enable a computer or group of computers to carry out a method of selecting a cluster in a group of nodes, the method comprising the steps of:
a) assigning a token to a first node in a group of nodes;
b) identifying subgroups of nodes that are interconnected; and
c) if the two largest the subgroups comprise equal numbers of nodes then selecting as the cluster the subgroup containing the node to which the token is assigned.

Some embodiments are implemented as a computer program or group of computer programs arranged to enable a computer or group of computers to provide apparatus for selecting a cluster in a group of nodes, the apparatus comprising:
a) a token assigned to a node in a group of nodes;
b) communication means for identifying subgroups of nodes that are interconnected; and
c) selecting means operable if the two largest the subgroups comprise equal numbers of nodes to select as the cluster the subgroup containing the node to which the token is assigned.

Some embodiments are implemented as a computer program or group of computer programs arranged to enable a computer or group of computers to carry out a method of operating a node in a cluster, the method comprising the steps of:
a) determining the number of other nodes connected to the current node forming a connected group;
b) if the connected group of nodes comprises more than half of the total nodes in the cluster, then forming the cluster from the group; or
c) if the connected group comprises half of the total nodes then forming the cluster if the connected group includes a node to which a token is assigned.

Some embodiments are implemented as a computer program or group of computer programs arranged to enable a computer or group of computers to provide a node in a cluster comprising:
a) means for determining the number of other nodes connected to the current node forming a connected group;
b) means operable if the connected group of nodes comprises more than half of the total nodes in the cluster, to form the cluster from the group; or
c) means operable if the connected group comprises half of the total nodes to form the cluster if the connected group includes a node to which a token is assigned.

Some embodiments are implemented as a computer program or group of computer programs arranged to enable a computer or group of computers to carry out a method of selecting a cluster in a group of nodes, the method comprising the steps of:
a) assigning a token at random to a node in a group of nodes;
b) assigning a vote to each node;
b) identifying subgroups of interconnected nodes; and
c) if the number of votes of the largest subgroups are equal then selecting as the cluster the subgroup containing the node to which the token is assigned, otherwise selecting the subgroup with the majority of votes.

FIG. 1 shows a computer system in the form of a cluster server 101 comprising four computers 103, 105, 107, 109 each running cluster server software and each constituting a node in a group of nodes that form the cluster server 101. The nodes are interconnected by a private network connection called a cluster interconnect 111. The cluster has three shared storage devices 113, 115, 117 which are accessed by another network connection in the form of a shared storage bus 119. A communications link 121 links each node to a wide area network (WAN) 123 in the form of the internet and enables communications between the cluster server 101 and a client computer 125. The client computer 125 is operable to access data and services provided by the cluster server 101 over the WAN 123.

In the event of a failure in the cluster interconnect 111, the cluster server software running on each node 103, 105, 107, 109 is arranged to spontaneously reorganize the subgroups of nodes which are interconnected. Only the subgroup comprising the majority of nodes will be designated to form the new cluster. If no subgroup comprises such a majority then no cluster will be designated until a subsequent reorganization results in a majority subgroup or until the nodes are reconfigured.

Each node knows that the cluster has a total of four nodes and therefore any subgroup with three nodes holds the majority of nodes and will form the new cluster. However, if a subgroup is made up of two nodes then it would be a joint largest subgroup. In order to resolve this situation where two largest subgroups are created during the formation or reconfiguration of the cluster, a token in the form of a global variable is created when the cluster is first configured. The token is counted as one node when a group of nodes is determining if it comprises the majority of nodes. If two subgroups comprise equal numbers of nodes the subgroup including the node holding the token forms the cluster. In other words, each node can be treated as having one vote and in the event of a tie in the number of votes between candidate clusters, the token provides a tie breaker vote. In the case where there are an odd number of nodes in the system as a whole, the token is not required and therefore not counted.

The token is arranged to move from node to node in the cluster at predetermined time intervals. When a node receives the token, it selects another node at random from the list of nodes connected to it. Once the predetermined time interval has elapsed, the node sends the token to the selected node. The token keeps moving among the connected nodes for the life of the cluster. The token is implemented in each node by a global variable called quorum_token. When quorum_token equals zero for a node, then that node does not hold the token. If quorum_token is equal to one for a node, this signifies that the node holds the token. At any point of time only one node has a nonzero quorum_token. The token is initialized when the first node of the cluster is created and starts its rotation from that first node. Moving the token from one node to another is carried out by setting quorum_token to zero on a token transmitting node and setting quorum_token to one on a receiving node. The token movement is an atomic transaction which uses a three phase commit protocol to set quorum_token on the transmitting and receiving nodes.

An example of this movement is illustrated in FIG. 2. The first node in the cluster is node 103 where the token 201 is initialized. From node 103 the token 201 moves at successive predetermined intervals to randomly chosen nodes 109 and 105 respectively. After a further interval the token 201 then returns by chance to node 103, as shown in FIG. 2, and then randomly chooses to move to node 107. The token 201 is effectively an autonomous tie breaker with a randomly chosen location within a group of nodes.

The processing carried out by nodes during cluster formation or reconfiguration is performed in co-operation with the other nodes in the subgroup of which any given node forms a part. In other words, the nodes collectively determine whether or not they form the largest subgroup and thus whether they should form the new cluster. This processing will be described in further detail with reference to the flow chart of FIG. 3. At step 301, the process is initiated by a cluster being either created or reconfigured. A cluster may be reconfigured automatically as a result of communications failures between nodes or manually by a system administrator. Processing then moves to step 303 where each node communicates with its connected nodes to identify the size of the subgroup. Processing then moves to step 305 where the subgroup compares its number of nodes to the total number of nodes to determine if that subgroup is the largest or majority group. If the subgroup does not hold a majority of the nodes then processing moves to step 307 where the nodes of that subgroup await a further reconfiguration. If, however, the subgroup comprises a majority of the nodes then processing moves to step 309 where that single largest group is designated as the cluster and provides the functions and services of the cluster. In the event of a subgroup identifying that it comprises half of all the nodes, then a subgroup holding the token will move from step 305 to step 309 while the subgroup without the token will move to step 307.

FIG. 4 illustrates the processing carried out by each node on receipt of the token 201. At step 401, the node receives the token from a connected node using the three phase commit protocol described above to ensure that the token transfer is atomic. The result of this step is the quorum_token variable being set to one on the current receiving node and to zero on the transmitting node. Processing then moves to step 403 where a timer is initiated with the predetermined time interval. Once the time interval has elapsed, processing moves to step 405 where the node chooses a connected node at random as the recipient of the token 201. Processing then moves to step 407 where the token is transmitted to the new recipient node using the three phase process described above. The process then repeats on the receiving node for the duration of the life of the cluster.

In another embodiment the token may be passed between nodes at random time intervals. In a further embodiment, the transfer of the token between nodes may be suspended for a period of time under the control of a system user. In other embodiments the token carries more than one vote. In some embodiments if a node has a planned shut down it is arranged to pass the token to another node prior to shutting down. In another embodiment, each node is assigned one or more votes and if two subgroups hold the largest numbers of votes then the subgroup containing the node to which said token is assigned is selected as the cluster. In some embodiments, the token may count for one or more votes and the number of votes or nodes held by a subgroup can be treated as being equal if the difference between them falls within a predetermined limit or band.

It will be understood by those skilled in the art that the apparatus that embodies a part or all of the present technique disclosed here may be a general purpose device having software arranged to provide a part or all of an embodiment of the invention. The device could be single device or a group of devices and the software could be a single program or a set of programs. Furthermore, any or all of the software used to implement the technique can be communicated via various transmission or storage means such as computer networks or storage devices so that the software can be loaded onto one or more devices.

While the present technique has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the technique disclosed here in its broader aspects is not limited to the specific details representative apparatus and method, and illustrative examples shown and described. Accordingly, departures may be made from such details without departure from the spirit or scope of applicant's general inventive concept.

The invention claimed is:

1. A method of selecting a cluster in a group of nodes, said method comprising the steps of:
   a) assigning a token to a first node in the group of nodes;
   b) identifying subgroups, from among the group of nodes, that are interconnected; and
   c) if two largest subgroups, from among the identified subgroups, comprise equal numbers of nodes, then selecting as the cluster a subgroup containing the node to which said token is assigned.

2. A method according to claim 1 in which said token is passed from one node to another.

3. A method according to claim 2 in which said token is passed between nodes at predetermined time intervals and/or random time interval.

4. A method according to any of claim 2 in which said passing of said token can be suspended.

5. A method according to claim 2 in which said passing of said token between nodes is carried out atomically so that said token is not lost and remains unique.

6. A method according to claim 2 in which said passing of said token between nodes is carried out using a three phase commit protocol.

7. A method according to claim 1 in which said first node is the first node assigned to the cluster during cluster configuration.

8. A method according to claim 1 in which if a node holding said token is required to shut down then prior to said shut down said token is passed to another node.

9. A method according to claim 1 in which if a node holding said token crashes then step c) is suspended until said node reboots.

10. A method according to claim 1 in which each node is assigned one or more votes and in step c) if two subgroups hold the largest numbers of votes then selecting as the cluster the subgroup containing the node to which said token is assigned.

11. A method according to claim 10 in which said token counts for one or more votes.

12. A method according to claim 10, in which the number of votes or nodes held by subgroups is treated as being equal if the difference between them falls within a predetermined limit.

13. The method according to claim 1, wherein the token is a global variable.

14. An apparatus for selecting a cluster in a group of nodes, wherein the apparatus is a part of a computer system, the apparatus comprising:
   a) a token assigned to a first node in the group of nodes;
   b) communication means for identifying subgroups of nodes in the group of nodes that are interconnected; and
   c) selecting means, operable if two subgroups are largest of the identified subgroups and the two subgroups comprise equal numbers of nodes, to select as the cluster the subgroup containing the node to which said token is assigned.

15. The apparatus of claim 14, wherein said token is between nodes at predetermined time intervals and/or random time interval.

16. The apparatus of claim 15, wherein said passing of said token between nodes is carried out atomically so that said token is not lost and remains unique.

17. The apparatus of claim 14, said first node is the first node assigned to the cluster during cluster configuration.

18. The apparatus of claim 14, wherein if a node holding said token is required to shut down then prior to said shut down said token is passed to another node.

19. The apparatus of claim 14, wherein if a node holding said token crashes then operation of said selecting means is suspended until said node reboots.

20. The apparatus of claim 14, wherein each node is assigned one or more votes and said selecting means is operable if two subgroups hold the largest numbers of votes to select as the cluster the subgroup containing the node to which said token is assigned.

21. The apparatus of claim 20, wherein a number of votes or nodes held by subgroups is treated as being equal if a difference between them falls within a predetermined limit.

22. The apparatus according to claim 14, wherein the token is a global variable.

23. A method of operating a node in a cluster, said method comprising the steps of:
   a) determining a number of nodes connected to form a connected group of nodes;
   b) if said connected group of nodes comprises more than half of a total number of nodes in the cluster, then forming the cluster from said group of nodes; or
   c) if said connected group comprises half of said total number of nodes, then forming said cluster if said connected group includes a node to which a token is assigned;
   d) wherein a number of nodes held by subgroups is treated as being equal if a difference between them falls within a predetermined limit;
   wherein the token is a global variable.

* * * * *

UNITED STATES PATENT AND TRADEMARK OFFICE
CERTIFICATE OF CORRECTION

| | | |
|---|---|---|
| PATENT NO. | : 8,812,501 B2 | Page 1 of 1 |
| APPLICATION NO. | : 11/491362 | |
| DATED | : August 19, 2014 | |
| INVENTOR(S) | : Tanmay Kumar Pradhan | |

It is certified that error appears in the above-identified patent and that said Letters Patent is hereby corrected as shown below:

In the Specification

In column 1, line 60, above "Brief Summary of the Invention"
delete "BRIEF DESCRIPTION OF THE DRAWINGS".

In column 2, line 7, above "Embodiments of the invention"
insert -- BRIEF DESCRIPTION OF THE DRAWINGS --.

In the Claims

In column 6, line 44, in Claim 4, delete "any of claim" and insert -- claim --, therefor.

In column 7, line 25, in Claim 17, delete "said" and insert -- wherein said --, therefor.

Signed and Sealed this
Second Day of December, 2014

Michelle K. Lee
*Deputy Director of the United States Patent and Trademark Office*